United States Patent

[11] 3,580,548

| [72] | Inventor | Carroll E. Moore |
| | | Minneapolis, Minn. |
| [21] | Appl. No. | 825,366 |
| [22] | Filed | May 16, 1969 |
| [45] | Patented | May 25, 1971 |
| [73] | Assignee | Farmhand, Inc. |
| | | Hopkins, Minn. |

[54] CONVEYOR ATTACHMENT FOR PORTABLE FEED MILL
7 Claims, 5 Drawing Figs.

| [52] | U.S. Cl. | 259/95 |
| [51] | Int. Cl. | B01f 5/12, B01f 7/00 |
| [50] | Field of Search | 259/18, 21, 95—98, 102, 115, 9, 6 |

[56] References Cited
UNITED STATES PATENTS

| 2,970,778 | 2/1961 | McIlvaine | 259/95X |
| 3,239,198 | 3/1966 | Albright et al. | 259/95X |
| 3,393,898 | 7/1968 | Lanier | 259/95X |
| 2,976,025 | 3/1961 | Pro | 259/6X |
| 2,953,360 | 9/1960 | Kline | 259/9 |
| 3,168,291 | 2/1965 | Knoedler et al. | 259/9 |
| 3,369,762 | 2/1968 | Buzenberg et al. | 259/9X |

*Primary Examiner*—Jordan Franklin
*Assistant Examiner*—George V. Larkin
*Attorney*—Merchant and Gould ABSTRACT: An attachment for mounting a feeding auger to the mixing tank of a portable feed mill for driving engagement with a rotary mixing device in the mixing tank, to convey material selectively to a plurality of inlets to the mixing tank, from various points of supply exterior of the tank. Supporting structure is rotatively mounted on the mixing tank and the feeding auger is operatively connected to the supporting structure for universal swinging movements relative to the supporting structure.

Patented May 25, 1971 — 3,580,548

INVENTOR.
CARROLL E. MOORE
BY
Merchant & Gould
ATTORNEYS

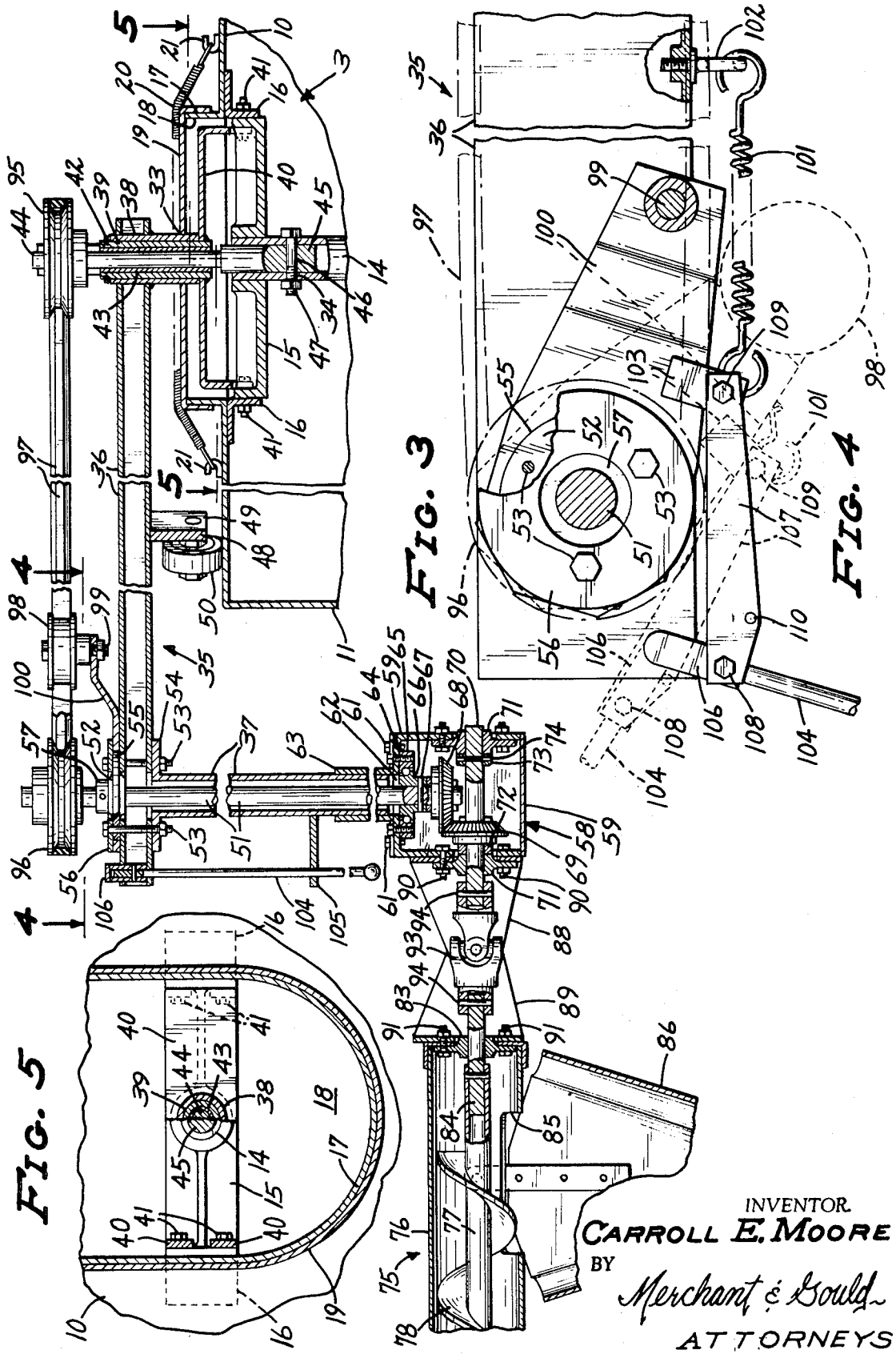

3,580,548

CONVEYOR ATTACHMENT FOR PORTABLE FEED MILL

BACKGROUND OF THE INVENTION

Portable feed grinding and mixing machines are well known, usually involving a vertically disposed mixing tank, a grinding mill or hammer mill for grinding feed material, and means for delivering ground material from the grinding mill to the mixing tank. These machines are also provided with the inlet hoppers for feeding additives to the mixing tank independently of the grinding mill. Further, the mixing tanks of such machines are provided with one or more vertically extended power driven rotary shafts therein equipped with mixing paddles or like devices. Material is delivered to the grinding mill and inlet hopper manually or by conveyors having separate connections to a source of driving power, and it is often necessary that the machine be shifted from place to place for obtaining different feed materials to be mixed therein. Otherwise, some of the feed materials or additives must be brought to the machine when access to these additives is not sufficiently convenient to the machine when the same is receiving a charge of other feed material.

SUMMARY OF THE INVENTION

An important object of this invention is provision of a conveyor attachment for portable feed mills, wherein a single conveyor may be utilized to deliver material from different points spaced from the machine selectively to a plurality of inlets to the mixing tank of the machine.

Another object of this invention is the provision of an attachment which receives driving power from the grinding and mixing machine and which may be quickly and easily moved to deliver materials from various points to given ones of said inlets to the mixing tank.

Other objects include the provision of an attachment as set forth, which can be easily mounted on a portable feed mill with a minimum of modification to the mill, which is easily stored on the mill when not in use, and which includes means for quickly and easily rendering the conveyor operative or inoperative.

To the above ends, an attachment is provided comprising, a generally horizontal support arm pivotally connected at one end to a mounting bracket adapted to be mounted to the top of the mixing tank for movements of the support arm about the axis of a rotary mixing shaft in the tank, a drive shaft journaled in the mounting bracket for connection to the mixing shaft, a jack shaft journaled in the opposite end of the support arm on an axis parallel to the drive shaft and in laterally outwardly spaced relation to the tank, and a screw conveyor operatively coupled to the jack shaft by means of gearing and a universal coupling. The jack shaft is connected to the drive shaft by an endless flexible drive belt normally loosely entrained over pulleys on the drive shaft and jack shaft and brought into driving engagement with the pulleys by an idler pulley movably mounted on the support arm. The pivotal connection of the support arm to the mounting bracket permits the support arm to swing circumferentially of the tank, and the universal connection of the screw or auger conveyor to the jack shaft permits the conveyor to be moved in any desired direction relative to the support arm and to the mixing tank in all positions of the support arm relative to the tank.

DESCRIPTION OF THE DRAWINGS

FIG. 3 is an enlarged fragmentary section taken on the line 3-3 of FIG. 1, showing a different position of some of the parts;

FIG. 4 is a further enlarged fragmentary detail, partly in plan and partly in section, taken on the line 4-4 of FIG. 3; and FIG. 5 is a fragmentary section taken substantially on the line 5-5 of FIG. 3.

DETAILED DESCRIPTION

Figures 1, 2:
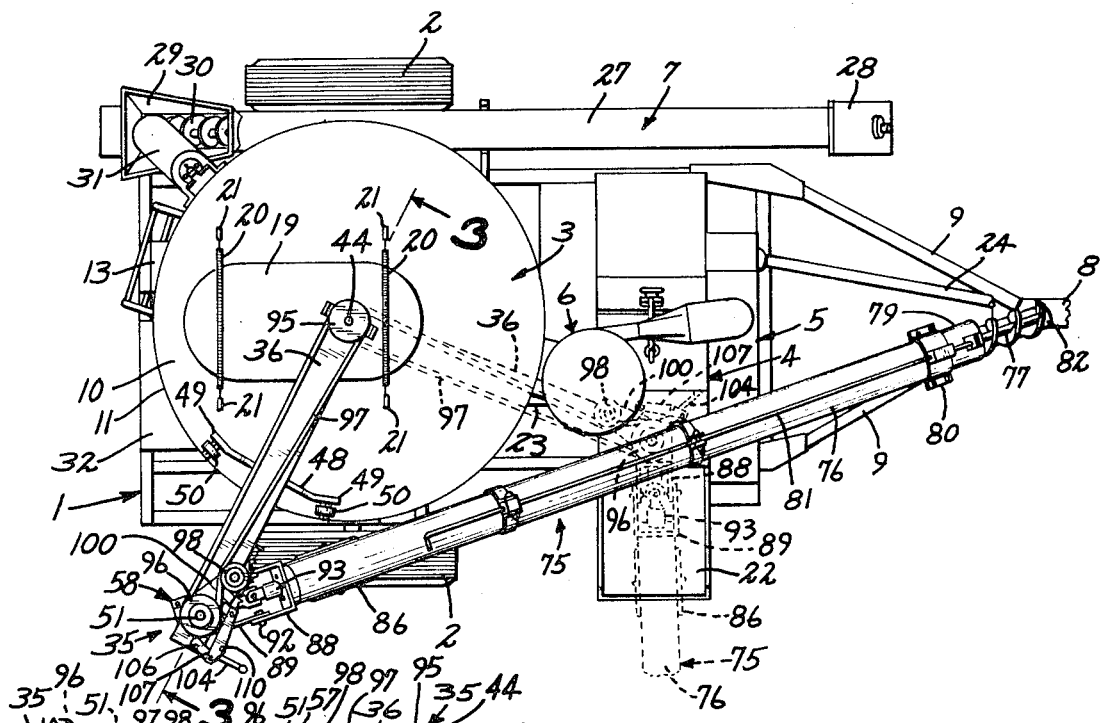
FIG. 1 is a view in plan of a portable feed mill showing the conveyor attachment of this invention mounted thereon, some parts being broken away.
FIG. 2 is a view in side elevation, some parts being broken away.

In FIGS. 1 and 2 of the drawings, a generally conventional portable feed mill and mixer is shown as comprising a generally rectangular frame or chassis 1 supported by a pair of pneumatic tire-equipped wheels 2, a generally cylindrical mixing tank 3, a grinding mill or hammer mill 4 mounted on the frame 1 forwardly of the tank 3, a blower 5, a centrifugal airdust separator 6, and a material delivery conveyor 7. A tow bar 8 is connected to the front end of the frame 1 by a pair of forwardly converging arms 9, the tow bar 8 being adapted to be operatively connected to a towing vehicle, such as a tractor or the like, not shown. The mixing tank 3 is generally cylindrical in form, having a flat top 10, a generally cylindrical wall portion 11 and a hopperlike bottom portion 12, the tank 3 being supported from the frame 1 by circumferentially spaced legs 13. A tubular mixing shaft 14 is disposed axially within the tank 3, as shown fragmentarily in FIG. 3, and at its upper end is journaled in a bearing bracket or the like 15 that is bolted to a pair of anchoring members 16 welded or otherwise rigidly secured to the top wall 10 of the tank 3. The top wall 10 is formed to provide an upstanding flange 17 that defines an opening 18 normally closed by a cover 19 releasably held in place by a pair of coil tension springs 20 that are secured at their opposite ends to anchoring clips 21 mounted fast on the top wall 10. Although not shown, it may be assumed that the mixing shaft 14 is provided with the usual mixing paddles or agitator bars for mixing feed within the tank, responsive to rotation of the shaft 14.

The hammer mill 4 is provided with an inlet chute 22 for delivery of material to be ground, and an outlet tube 23 leading to the bottom of the mixing tank 3. A screw conveyor, not shown, is disposed in the outlet tube 23 to convey material from the hammer mill 4 to the mixing tank 3, the hammer mill 4, blower 5, and mixing shaft 14 all being operatively connected to and driven by a drive shaft 24 shown fragmentarily in FIGS. 1 and 2, the drive shaft 24 being adapted to be connected to a suitable source of driving power, such as the power takeoff mechanism of the pulling vehicle, not shown. The blower 5 conveys dust and other light material from the hammer mill 4 to the separator 6, through a conduit 25, the separated-out dust and other light particles being delivered from the separator 6 to the outlet tube 23 through a delivery tube 26.

The discharge conveyor 7 comprises an elongated tubular member 27 having a discharge head 28 at one end and an inlet hopper 29 at its opposite end, and a conveyor auger 30 journaled therein. Material to be discharged from the tank 3 is delivered to the hopper 29 through suitable means including a discharge chute 31. As shown in FIG. 2, the mixing tank 3 is further provided at its bottom portion with a receiving hopper 32 by means of which material may be introduced to the mixing tank 3 independently of the hammer mill 4. Conveniently, food additives are introduced to the mixing tank 3 through the hopper 32 during introduction of material to the tank 3 from the hammer mill 4, if desired. The portable feed mill and mixer illustrated and above-described is of a well-known and commercially available type, and, in and of itself, does not comprise the instant invention. Hence, further detailed showing and description thereof is omitted, in the interest of brevity. It should be here noted that, the only modification of the feed mill necessary to the mounting of the attachment of this invention thereon, is the boring of a clearance hole 33 in the cover 19 in axial alignment with the mixing shaft 14, and the drilling of a transverse opening 34 in the upper end portion of the mixing shaft 14 below the bearing bracket 15, as shown in FIG. 3.

The attachment of this invention comprises supporting structure 35 which includes a horizontally disposed rigid support arm 36, and a leg in the nature of a rigid tube 37 depending from the outer end portion of the arm 36. The support arm 36 is adapted to be disposed generally horizontally above the tank top 10, and at its inner end portion is provided with a vertically disposed sleeve 38 that is journaled on a tubular stem 39 welded or otherwise rigidly secured at its lower end to a mounting bracket 40 rigidly secured in the tank top opening 18 by nut-equipped bolts or the like 41 that are otherwise used to mount the bearing bracket 15 to the anchoring members 16, the tubular stem 39 being axially aligned with the mixing shaft 14, as shown in FIG. 3. The sleeve 38 and stem 39 extend axially through the opening 33 in the cover 19, the lower end of the sleeve 38 resting on the mounting bracket 40. Adjacent its upper end, the stem 39 is provided with an annular groove for reception of a conventional snapring 42 which limits axially upward movement of the sleeve 38 and support arm 36. The stem 39 is further provided with an elongated sleeve bearing 43 in which is journaled a vertically disposed drive shaft 44 having a lower end portion 45 that is telescopically received in the upper end portion of the mixing shaft 40. The shaft end portion 45 is provided with a transverse opening 46 that is alignable with the opening 34 for reception of a nut-equipped locking screw 47, whereby the drive shaft 44 is rotated in common with the mixing shaft 14. The support arm 36 is provided intermediate its ends by a horizontally disposed transverse cross bar 48 having opposite angularly disposed end portions 49 to which are journaled a pair of rollers 50 that rest upon and have rolling engagement with the top wall 10 of the mixing tank 3, to carry the weight of the supporting structure 35 in all positions of swinging movement thereof about the common axis of the mixing shaft 14 and drive shaft 44.

A vertically disposed jack shaft 51 extends axially through the rigid tube 37 and upwardly through the outer end portion of the support arm 36, the upper end portion of the jack shaft 51 being journaled in a bearing 52. The tube 37 and bearing 52 are rigidly secured to the outer end portion of the support arm 36 by a plurality of nut-equipped bolts 53 that extend through suitable openings in a radial flange 54 on the upper end of the tube 37, through suitable openings in the outer end portion of the support arm 36 and in a radially outwardly projecting flange 55 on the bearing 52 and engaging the top surface of the support arm 36, and suitable openings in a retainer plate 56 that overlies the bearing flange 55. A thrust collar 57 is pinned or otherwise secured on the jack shaft 51 to limit downward axial movement of the jack shaft 51 relative to the bearing 52, support arm 36 and tube 37.

A generally rectangular gear housing 58 includes an inverted generally U-shaped housing member 59 and a cover element 60 partially encompassing the housing member 59 and secured thereto by machine screws or the like 61. The top portion of the housing member 59 is provided with a central opening 62, and a tubular hub element 63 is welded or otherwise rigidly secured to the top portion of the housing member 59 in axial alignment with the opening 62, the lower end portion of the tube 37 being telescopically received and journaled in the tubular hub element 63, A rolling friction bearing 64 is disposed within the housing 58, and includes an outer race 65 bolted or otherwise rigidly secured to the top portion of the housing member 59 and an inner race 66 mounted on the lower end portion of the jack shaft 51 and rigidly secured thereto by suitable means, such as a transverse pin 67. Preferably, the bearing 64 is of the ball bearing type particularly adapted for carrying thrust as well as radial loads. A bevel or mitre gear 68 is keyed or otherwise rigidly mounted on the lower end of the jack shaft 51, and has meshing engagement with a cooperating bevel gear 69 that is rigidly mounted on a horizontally disposed cross shaft 70 that is journaled in bearings 71 rigidly mounted on opposite sides of the housing member 59. A pair of thrust collars 72 and 73 are mounted on the cross shaft 70, to hold the gear 69 in proper meshing engagement with its cooperating gear 68, the thrust collar 73 being pinned to the shaft 70, as indicated at 74.

An elongated conveyor, indicated generally at 75, includes a tubular housing 76 and an auger extending longitudinally therethrough, the auger comprising an auger shaft 77 and an auger flight 78. At its inlet end, the housing is provided with a concentric sleeve 79 and a mounting yoke 80 therefor, the sleeve 79 and mounting yoke 80 being movable axially of the housing 76, such movement being controlled by an elongated control handle 81. Axial movement of the sleeve 79 relative to the housing 76 exposes more or less of the auger flight 78 to the material to be conveyed thereby, whereby to control the rate of feed of the conveyor 75. A supporting member or foot 82 is rigidly secured to the yoke 80 and underlies the exposed inlet end portion of the auger flight 78 to maintain the same in upwardly spaced relation to a bin floor or the ground during operation thereof. At the opposite or discharge end of the conveyor 75, the housing 76 is provided with a bearing 83 that journals a shaft extension 84 of the auger shaft 77. Further, the housing 76 is formed to provide a discharge opening 85, and a funnellike discharge conduit 86 is pivotally mounted to the housing 76 in underlying relationship to the discharge opening 85. When required, as shown by dotted lines in FIG. 2, an auxiliary chute 87 may be pivotally mounted to the bottom end portion of the conduit 86 to guide material delivered by the conveyor 75 to such points as the receiving hopper 32.

The conveyor 75 is secured to the supporting structure 35 by means of a pair of cooperating generally U-shaped yoke elements 88 and 89, the former of which is rigidly secured to the gear housing member 59 by nut-equipped bolts 90 that are also used to secure the adjacent bearing 71 to the housing member 59, and the latter of which is rigidly secured to the adjacent end of the conveyor housing 76 by nut-equipped screws or bolts 91 that are also used to secure the bearing 83 to the conveyor housing 76, as shown in FIG. 3. The yoke elements 88 and 89 are pivotally connected together on a generally horizontal axis by pivot pins or the like 92, see particularly FIGS. 1 and 2. The shaft extension 84 is operatively connected to the cross shaft 70 by a universal coupling 93 the pivot axes of which are disposed on or intersect the common axis of the pivot pins 92. As shown in FIG. 3, the universal coupling 93 is secured to the cross shaft 70 and shaft extension 84 by cross pins or the like 94. With this arrangement, the conveyor 75 may be swung upwardly and downwardly relative to the supporting structure 35 on the axis of the pins 92, and swung laterally about the common axis of the tube 37 and jack shaft 51 due to the pivotal mounting of the gear housing 58 on the tube 37 and the shaft 51.

The drive shaft 44 is operatively connected to the jack shaft 51 by a pair of V-pulleys 95 and 96 rigidly mounted on the drive shaft 44 and jack shaft 51, respectively, and an endless flexible V-belt 97 normally loosely entrained over the pulleys 95 and 96. An idler pulley 98 is journaled on a shaft 99 in alignment with the belt 97, the shaft 99 being mounted on a radial arm 100 that is journaled on the bearing flange 55 between the top of the support arm 36 and retainer plate 56. The radial arm 100 is movable about the axis of the jack shaft 51 to move the idler pulley 98 toward and away from an adjacent flight of the belt 97 to respectively tighten the belt 97 into driving engagement with the pulleys 95 and 96 and to permit loosening of the belt 97 into slipping engagement with the pulleys 95 and 96. The radial arm 100 is yieldingly urged in a belt-tightening direction by a coil tension spring 101 that is anchored at one end to the support arm 36, as indicated at 102, and at its other end to a bracket element 103 on the radial arm 100. Means for moving the radial arm 100 in a belt-loosening direction against bias of the spring 101 comprises a handle-equipped control shaft 104 disposed in spaced parallel relationship to the tube 37 and journaled at its upper end portion in the extreme outer end portion of the support arm 36 and in a bearing bracket 105 projecting laterally outwardly from tube 37. A crank arm 106 is rigidly secured to the upper end portion of the control shaft 104 and is pivotally connected at its radially outer end to one end of a rigid link 107, as indicated at 108, the opposite end of the link 107 being pivotally secured to the bracket element 103, as indicated at 109. As shown in FIG. 4, the crank arm 106 is movable between a full line position wherein the idler pulley 98 is in belt-tightened engagement with the V-belt 97, and a dotted line position wherein the idler pulley 98 is out of engagement with the belt 97, at which belt-release position, the link 107 is disposed at or just beyond a dead center relationship of its pivotal connections 108 and 109 to the pivot axis of the control shaft 104, so that the idler pulley 98 is held against movement toward engagement with the belt 97. A stop pin 110 depends from the link 107 and engages the crank arm 106 to limit movement of the crank arm 106 in its direction beyond said dead center relationship.

The pivotal mounting of the support arm 36 on the mounting bracket 40, the rotary mounting of the gear housing 58 on the tube 37, and the pivotal connection between the yoke elements 88 and 89 permit the conveyor 75 to be disposed in any desired direction and position relative to the feed mill and mixer upon which it is mounted. In FIGS. 1 and 2, the attachment is shown by full lines in a storage and transport position. In FIG. 1, the attachment is shown by dotted lines in a position to deliver material to the hammer mill chute 22; and in FIG. 2, the attachment is shown by dotted lines positioned to deliver material to the receiving hopper 32. If desired, the attachment may be used to convey material from one receptacle to another while the feed mill is being utilized to grind and mix other materials. The pivotal mounting of the support arm 36 to its mounting bracket 40 permits of easy installation, the mounting bracket 40 being mounted in place prior to the mounting of the support arm 36 on the tubular stem 39. The length of the tubular stem 39 and sleeve 38 permits the cover 19 to be raised from engagement with the flange 17 and swung to one side or the other about the axis of the mixing shaft 14 for inspection or cleaning of the interior of the tank 3. If it is desired to totally remove the cover 19, it is only necessary to remove the snapring 42 from the stem 39 and the pulley 95 from the drive shaft 44. This attachment has been found to be extremely useful in delivering material to the machine from storage bins or other receptacles wherein it is inconvenient to otherwise remove the material therefrom.

I claim:

1. A conveyor attachment for portable feed mills of the type including a generally vertically disposed cylindrical mixing tank having at least one feed inlet at a side thereof and a generally vertically disposed power driven rotary mixing device in said tank, said attachment comprising:
  a. a mounting bracket for connection to said tank at its upper end;
  b. supporting structure including an elongated generally horizontal support member having an inner end journaled on said mounting bracket on the axis of said mixing device, and an outer end portion projecting radially beyond the side of the mixing tank;
  c. a drive shaft journaled in said mounting bracket for connection to the mixing device in axial alignment and for common rotation therewith;
  d. a generally vertical jack shaft journaled on the outer end portion of said support member outwardly in laterally spaced relation to the tank;
  e. an elongated conveyor including a tubular housing defining an inlet end, an opposite end, and an outlet adjacent said opposite end, and a longitudinally extending auger journaled for rotation in said housing;
  f. means mounting said opposite end of the conveyor housing to said supporting structure for universal swinging movements of the conveyor relative to the supporting structure;
  g. and power transmission mechanism operatively rotatably connecting said auger to said drive shaft and including said jack shaft.

2. The conveyor attachment according to claim 1 in which said supporting structure includes roller means on said support member intermediate said inner end and outer end portion thereof for rolling engagement with the upper end of the tank about the axis of said mixing device.

3. The conveyor attachment according to claim 1 in which said supporting structure includes an elongated leg element extending downwardly from the upper end portion of said support member, said jack shaft extending longitudinally of said leg element.

4. The conveyor attachment according to claim 3 in which said leg element comprises a rigid tube, said mounting means comprising a housing member pivotally mounted on said tube for rotation on the axis of said tube, and a pair of cooperating yoke elements one on said housing member and the other on said opposite end of the tubular auger housing; said yoke elements being pivotally connected together on a generally horizontal axis.

5. The conveyor attachment according to claim 4 in which said power transmission mechanism includes, a generally horizontal shaft journaled in said housing member, intermeshing gears on said jack shaft and said generally horizontal shaft, and a universal coupling connected to said generally horizontal shaft and said auger.

6. The conveyor attachment according to claim 1 in which said power transmission mechanism includes a pair of aligned pulleys on said drive shaft and jack shaft respectively, and an endless drive belt normally loosely entrained over said pulleys, characterized by an idler pulley aligned with said belt, means mounting said idler pulley on said supporting structure for movements toward and away from engagement with said belt to respectively tighten said belt into taut running engagement with said pulleys and release the belt for loose slipping engagement therewith, and control means for imparting said movements to the idler pulley.

7. The conveyor attachment according to claim 6 in which said control means comprises a control lever pivotally mounted on said supporting structure, a link pivotally connected to said control lever and the mounting means for said idler pulley, and a spring operatively connected to said lever and said supporting structure and responsive to movements of said link to opposite sides of dead center relationship with the pivotal mounting of said lever on the supporting structure to selectively urge said idler pulley in opposite directions of said movements thereof.